UNITED STATES PATENT OFFICE.

WILBERT J. HUFF, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

DEHYDRATION OF PYRIDINE.

1,416,206.

Specification of Letters Patent.  Patented May 16, 1922.

No Drawing.   Application filed January 27, 1921.   Serial No. 440,498.

*To all whom it may concern:*

Be it known that I, WILBERT J. HUFF, a citizen of the United States, residing at Pittsburgh, in the county of Allegheny and State of Pennsylvania, have invented a new and useful Improvement in Dehydration of Pyridine, of which the following is a full, clear, and exact description.

The present invention relates to the dehydration of pyridine which contains water as an impurity and has for its object the economical and efficient removal of the water.

The water is removed by adding a suitable low boiling point liquid to the water-containing pyridine, and distilling the mixture, the low boiling point liquid serving as a vehicle to carry off water. The water is separated from the distillate, and the distillate from which the water has been removed is re-used with the water-containing pyridine for further distillation and again acts as a vehicle to carry off more water. The operation is continued, using the low boiling point liquid over and over as the vehicle for carrying water until the desired degree of dehydration is attained.

In carrying out the present process I prefer to effect a preliminary separation of the water from the crude pyridine by "salting out" the crude mixture with a suitable salt, such as ammonium sulphate. Even after this treatment the pyridine may contain a considerable amount of water, sometimes as much as 20%.

A comparatively low boiling liquid such as a petroleum distillate boiling below 80° C., which is immiscible with water and miscible with anhydrous pyridine, is then added to the pyridine-water mixture as obtained above. The charge is then heated up until distillation begins. The first condensate consists of water and the low boiling liquid, together with some pyridine. This is allowed to separate into two layers, an aqueous layer and a layer containing chiefly the low boiling liquid and pyridine. This last is returned to the still as soon as convenient, from which it again distills, carrying with it more water. The distillation is continued, the aqueous layer of the condensate removed and the low boiling liquid and pyridine constantly returned to the still until an aqueous layer no longer appears in the condensate. At this period the still charge should be substantially free from water. The return of the non-aqueous layer to the still is then cut off. The distillation may then be continued to separate the low boiling liquid from the pyridine. This separation is preferably brought about by distillation through an efficient fractionating column. The first fraction in such a separation consists of the low boiling liquid together with some pyridine and water. The vapor temperature is carried to 115° C., (the approximate boiling point of pure pyridine). The condensate at this point is mixed with water to ascertain whether it is free from the low boiling liquid or not. If a separation takes place the distillation is continued until no separation occurs. The receiver is then changed and pyridine free from water and low boiling liquid, collected as a second fraction. The first fraction is returned to another charge of crude pyridine.

The aqueous layer obtained in the initial or dehydrating stage may contain more or less pyridine, depending upon the character of the low boiling liquid and its concentrations during the initial stage of the process. In case the pyridine content warrants it, this aqueous layer is returned to the crude aqueous pyridine of the next batch before its preliminary treatment with ammonium sulphate.

My process differs from processes in which no return of the low-boiling liquid to the distilling charge takes place, and possesses a marked advantage over such processes in that it requires a very much smaller quantity of the low-boiling liquid. It is much easier and cheaper to effect a recovery of pyridine when it contains only a small portion of the low-boiling liquid.

It has been proposed to dehydrate pyridine by adding to the pyridine benzol to the amount of 11.73 times the content of the water by volume so as to form a constant boiling point binary mixture of benzol and water which has a boiling point of about 69.5° C. This process entails the use of a large quantity of benzol. For example, with undehydrated pyridine which may contain 15% by volume of water, it is necessary to add benzol in an amount of from one and a half to two times the volume of the undehydrated pyridine. My process greatly reduces the amount of the low boiling point liquid, such as benzol, as I use a very much smaller quantity than is necessary to form the constant boiling point binary mixture with all of the water. By constantly adding the low boiling point liquid during the dehydrating process, I keep at all times during this process a sufficient quantity of such liquid in the still to give a condensate which shall separate into two phases, until the contents of the still are substantially dehydrated, but without using the large quantity heretofore required. Since the initial concentration of the low boiling point liquid is relatively low, the distillate in my process is relatively much higher in pyridine than is obtained in the first stages of the suggested process, above referred to; and throughout the greater part of my process, the water-containing distillate is not a binary mixture of water and low boiling point liquid, but is really a ternary mixture of pyridine, water and the low boiling point liquid, and the distillation temperature will, in general, be higher than the distillation temperature of the binary mixture of the low boiling point liquid and water. Since substantially all of the pyridine in the distillate is returned to the still with the low boiling point liquid, the pyridine loss is low, and I effect a dehydration with use of a minimum quantity of the low boiling point liquid. As contrasted with the suggested process, above referred to, in which a large quantity of benzol is added to form a binary constant boiling point mixture with all of the water, I use but a comparatively small fraction of the low boiling point liquid, such as benzol, and by a continued re-use of such smaller quantity effect the desired dehydration.

The amount of low-boiling liquid which should be added may be varied within rather wide limits. When the petroleum distillate boiling below 80° C. is used, I prefer to add a volume of petroleum distillate equal to about 30% of the volume of the anhydrous pyridine. When more petroleum distillate is used, the water layer contains less pyridine, but such higher concentrations of petroleum distillate involve more difficulty in separating the petroleum distillate from the pyridine. When decreasing amounts of petroleum distillate are used, more and more pyridine appears in the water layer, until at last no effective separation takes place.

When I use a petroleum distillate I prefer a fraction whose boiling temperatures do not fall much below 70° C., nor much above 80° C.

I may, however, use other liquids. Thus benzol may be used. This possesses the advantage that in like concentrations by volume it gives water layers containing less pyridine than does the petroleum distillate. Carbon di-sulphide may also be employed, but possesses the disadvantage that its fire hazard is very great. In general any low boiling liquid miscible with pyridine and immiscible with water may be employed, provided it is practicable to subsequently separate such a liquid from the pyridine by distillation.

While the process is preferably carried out with continuous distillation, continuous dehydration of the distillate and continuous refluxing of the dehydrated portion of the distillate back into the still, the distillation, dehydration of the distillate and its return to the still may be intermittent. Moreover it is not essential that the dehydrated portion of the distillate be returned to the identical still or batch from which it was distilled, as the dehydrated portion from one still may be introduced into the undehydrated pyridine in another still, or it may be retained and returned to the same still with a subsequent batch of undehydrated pyridine. This and similar variations in details may be made within the broader scope of my invention.

The term pyridine as herein employed is intended to include the pyridine bases or pyridine and its homologues.

The present invention is not limited to all of the above described details but may be otherwise practiced within the scope of the following claims.

I claim:

1. The process of dehydrating water-containing pyridine, comprising adding to the pyridine a low boiling point liquid which upon distillation serves as a vehicle to carry off water and in an amount less than that required to form a binary constant boiling point mixture with all of the water, distilling, and renewing the low boiling point liquid as it is distilled off, and continuing the distillation until the desired degree of dehydration is obtained, substantially as described.

2. The process of dehydrating water-containing pyridine, comprising adding to the pyridine a low boiling point liquid which upon distillation serves as a vehicle to carry off water but in an amount less than that required to carry off all of the water on a single distillation of such liquid, distilling, and adding more of the low boiling point liquid as the distillation continues, substantially as described.

3. The process of dehydrating water-containing pyridine, comprising adding to the pyridine a low boiling point liquid which upon distillation will serve as a vehicle to carry off water, distilling off a fraction from such mixture, removing water from the distillate, and returning the dehydrating portion of the distillate, and continuing said operation until the desired dehydration is attained, substantially as described.

4. The process of dehydrating water-containing pyridine, comprising adding to the pyridine a low boiling point liquid which upon distillation will serve as a vehicle to carry off water, continuously distilling the liquid, removing water from the distillate, and refluxing the dehydrated portion of the distillate back into the liquid being distilled, substantially as described.

5. The process of dehydrating water-containing pyridine, comprising adding to the pyridine a low boiling point liquid which upon distillation serves as a vehicle to carry off water and in an amount less than that required to form a binary constant boiling point mixture with all of the water, distilling, removing water from the distillate, and refluxing the dehydrated portion of the distillate back into the still, substantially as described.

6. The process of dehydrating water-containing pyridine, comprising adding to the pyridine a low boiling point liquid immiscible with water and miscible with pyridine and in an amount less than that required to form a binary constant boiling point mixture with all of the water, distilling, and adding further quantities of the low boiling point liquid as the distillation continues, substantially as described.

7. The process of dehydrating water-containing pyridine, comprising adding to the pyridine a low boiling point oil which upon distillation serves as a vehicle to carry off water but in an amount less than that required to carry off all of the water on a single distilling off of the quantity of oil initially added, distilling, and refluxing the oil as it is distilled off as the distillation continues, substantially as described.

8. The process of dehydrating water-containing pyridine, comprising adding to the pyridine a low boiling point oil which upon distillation serves as a vehicle to carry off water and in an amount less than that required to form a binary constant boiling point mixture with all of the water, distilling, removing water from the distillate, and refluxing the dehydrated portion of the distillate back into the still and continuing the distillation until the desired degree of dehydration is attained, substantially as described.

In testimony whereof, I have hereunto set my hand.

WILBERT J. HUFF.